(12) United States Patent
Myers et al.

(10) Patent No.: US 6,244,161 B1
(45) Date of Patent: Jun. 12, 2001

(54) HIGH TEMPERATURE-RESISTANT MATERIAL FOR ARTICULATED PISTONS

(75) Inventors: Martin R. Myers, Columbus, IN (US); Carmo Ribeiro, Ann Arbor, MI (US)

(73) Assignees: Cummins Engine Company, Inc., Columbus, IN (US); Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/414,269

(22) Filed: Oct. 7, 1999

(51) Int. Cl.[7] ............................................... F16J 1/04
(52) U.S. Cl. ................................. 92/224; 92/231
(58) Field of Search .............................. 92/222, 224, 231

(56) References Cited

U.S. PATENT DOCUMENTS

| | | | |
|---|---|---|---|
| 3,596,571 | 8/1971 | Hill et al. | 92/222 |
| 4,546,048 | 10/1985 | Guenther | 428/608 |
| 4,706,550 | 11/1987 | Bullat | 92/260 |
| 4,798,770 | 1/1989 | Donomoto et al. | 428/547 |
| 4,863,807 | 9/1989 | Krasicky, Jr. | 428/593 |
| 5,144,884 | 9/1992 | Kelly | 92/186 |
| 5,273,009 | 12/1993 | Ozawa et al. | 123/193.6 |
| 5,305,726 | 4/1994 | Scharman et al. | 123/668 |
| 5,317,958 | 6/1994 | Martins Leites et al. | 92/186 |
| 5,787,796 | 8/1998 | Ribeiro et al. | 92/186 |
| 5,934,174 * | 8/1999 | Abraham, Sr. et al. | 92/222 |

FOREIGN PATENT DOCUMENTS

| | | |
|---|---|---|
| 64-56947 | 3/1989 | (JP) . |
| 1-262352 | 10/1989 | (JP) . |

* cited by examiner

*Primary Examiner*—Edward K. Look
*Assistant Examiner*—Michael Leslie
(74) *Attorney, Agent, or Firm*—Woodard, Emhardt, Naughton, Moriarty & McNett

(57) ABSTRACT

This invention relates to a high temperature-resistant piston head. The piston head includes a first portion formed of a first material of heat-resistant steel alloy and the second portion is formed of a second a material of steel alloy that may be the same or may or different from the first material. The first and second portions are joined by a friction weld to form the assembled piston head. The heat-resistant steel alloy includes about 0.1 to about 0.5 wt % carbon, up to about 0.6 wt % manganese, about 4.0 to about 6.0 wt % chromium, about 0.45 to about 0.65 wt % molybdenum, up to about 0.5 wt % nickel and the balance iron and incidental impurities. In one form the second material includes about 0.30 to about 0.55 wt % carbon, about 0.4 to about 1.10 wt % manganese, about 0.40 to about 1.25 wt % chromium, about 0.15 to about 0.45 wt % molybdenum, up to about 0.4 wt % silicon, up to about 2 wt % Ni and greater than about 90 wt % iron.

20 Claims, 2 Drawing Sheets

HIGH TEMPERATURE-RESISTANT MATERIAL FOR ARTICULATED PISTONS

BACKGROUND OF THE INVENTION

In general, this invention relates to a piston and to a method of forming the piston. More specifically, but not exclusively, this invention is directed to a temperature-resistant piston head formed of a high temperature-resistant material and to a method of forming the temperature-resistant piston head.

Typical piston heads are formed of a single material that is selected to provide the requisite mechanical strength at the temperatures normally experienced in internal combustion engines. These materials are typically forged or cast steel alloys, which are subsequently heat-treated to improve their high temperature and temper resistance.

One prior art piston head includes a piston crown section and a connecting rod section. A friction weld joins the two sections into an assembled piston head. The two sections are formed of the same forged or cast steel alloy material to facilitate friction welding and subsequent heat treatment.

To improve performance, it is becoming increasingly desirable to operate internal combustion engines at higher temperatures. This desire is especially prominent in relation to larger diesel engines used in electrical power generation applications. Unfortunately, existing pistons tend to more readily oxidize, particularly at the combustion bowl rim, which typically is subjected to the highest operating temperature. The combustion bowl rim, and the piston head in general, may suffer from a loss of hardness if exposed to more extreme temperatures. As a result, piston head failure may become more frequent.

Thus, there is a need to provide pistons capable of withstanding the extreme thermal and mechanical loading likely to result from new, higher performance engines. The present invention addresses these needs.

SUMMARY OF THE INVENTION

There is provided in accordance with one form of the present invention, a unique piston capable of withstanding the thermal stress and mechanical loading of high performance engines.

In another form, the piston head includes a first portion and a second portion connected by a friction weld. The first portion is formed of high temperature oxidation-resistant material. In one embodiment, the first portion comprises, in weight percent, about 0.1 to about 0.5% carbon, up to about 0.6% manganese, about 4 to about 6% chromium, about 0.45 to about 0.65% molybdenum, up to about 0.5% nickel and the balance iron and incidental impurities. The second portion of the piston head is preferably formed of steel alloy capable of withstanding the mechanical forces generated from combusting fuel. The steel alloy of the second portion can comprise, in weight percent, about 0.30 to about 0.55% carbon, about 0.4 to about 01.10% magnesium, about 0.40 to about 1.25% chromium, about 0.15 to about 0.45% molybdenum, up to about 0.4% silicon, up to about 2 wt % Ni and greater than 90% iron; however, the second portion may alternatively be formed of a different material.

In still another form there is provided in accordance with the present invention a method of forming a piston head. The method comprises providing a first portion that includes a high temperature-resistant steel alloy and a second portion that includes a second material of a steel alloy, and friction-welding the first portion to the second portion. The first and second portions can be machined to provide a wide variety of piston design configurations for a piston crown and a piston rod connecting member, respectively.

Further objects, features, aspects, forms, embodiments, advantages and benefits shall become apparent from the description and drawings contained herein.

DETAILED DESCRIPTION OF THE INVENTION

Figure 1:
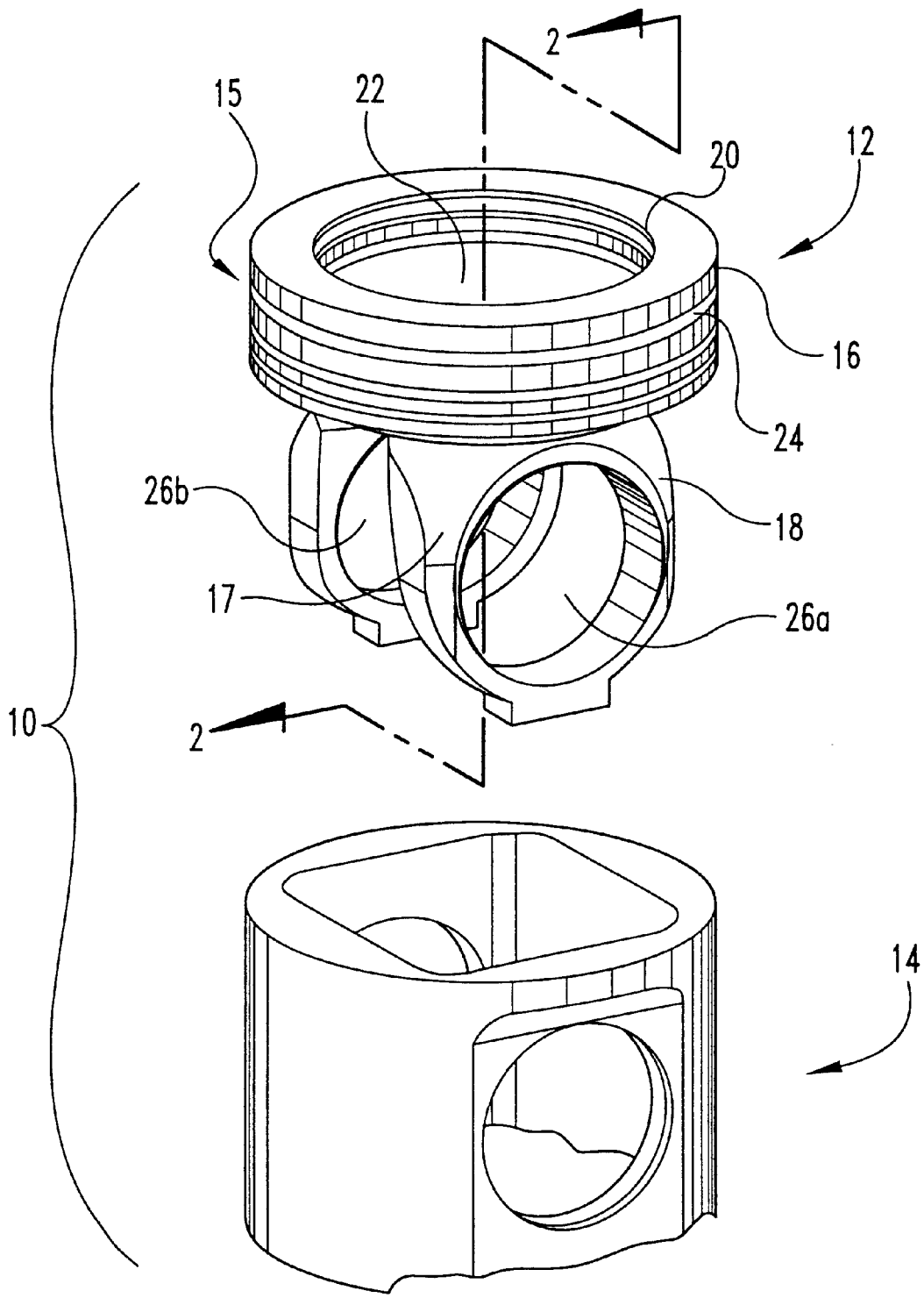
FIG. 1 is an exploded, perspective view of a piston head and a piston skirt of an articulated piston of one embodiment of the present invention.

For the purposes of promoting an understanding of the principles of the invention, reference will now be made to the embodiments illustrated in the drawings and specific language will be used to describe the same. It will, nevertheless, be understood that no limitation of the scope of the invention is thereby intended. Any alterations and further modifications in the described processes, systems, or devices and any further applications of the principles of the invention as described herein are contemplated as would normally occur to one skilled in the art to which the invention relates.

Generally, this invention relates to a piston head preferably for an articulated piston assembly. The piston head comprises a first portion and a second portion connected by a friction weld. The first portion is formed from a high temperature-resistant steel alloy and can be provided in various design configurations defining a piston crown. The piston crown is exposed to the extreme thermal conditions and compressive forces during operation of the engine. The high temperature-resistant steel alloy is selected to be capable of withstanding these extreme conditions in high performance engines. The resulting piston crown exhibits reduced high temperature oxidation and increased temper resistance. The second portion is formed of a steel alloy and is preferably formed into a piston rod connecting member. The piston rod connecting member is capable of withstanding a mechanical load resulting from the combustion of fuel, such that this load is reliably transferred to the connecting rod and eventually to the crankshaft in combustion engines, for example, in high-horsepower diesel engines.

The first and second portions can be individually machined prior to joining by friction welding. Machining the two portions individually allows greater design flexibility to include preferred features and characteristics for the high temperature-resistant piston crown and a high structural-strength piston rod connecting member. Individually machining the two portions of the piston head often significantly reduces costs of manufacturing piston heads over similarly designed heads forged as single units.

In one form, the assembled piston head prepared according to this invention is lighter and/or stronger, thereby allowing for a highly efficient operation of the associated combustion engine. The resulting assembled pistons find particularly advantageous use in heavy-duty combustion engines, most notably generator sets (gensets), marine diesel engines and heavy-duty truck diesel engines. As a result these diesel engines containing the inventive assembled piston heads generate greater horsepower, more efficiently and at a reduced cost.

Referring now to FIG. 1, there is illustrated one embodiment of an exploded view of an articulated piston 10. The articulated piston 10 includes piston head 12 and piston skirt 14.

Piston head 12 comprises a first portion 15 defining piston crown 16 and a second portion 18 defining a piston rod connecting member 17. Provided around the periphery of piston crown 16 is at least one, and preferably a plurality, of grooves 24 to receive piston rings (not shown) in a known manner. Second portion 18 includes passageways 26a and 26b to receive a wrist pin for journaling to a connecting rod in a standard manner (not shown).

The piston head 12 can be combined with piston skirt 14 to form the articulated piston assembly. Piston skirt 14 is provided to surround second portion 18 of piston head 12 and is not subjected to either the extreme temperature variances or the mechanical loading experienced by piston head 12 during normal use. Therefore, the piston skirt 14 can be made of a lighter material, generally aluminum or an aluminum alloy.

Figure 2:
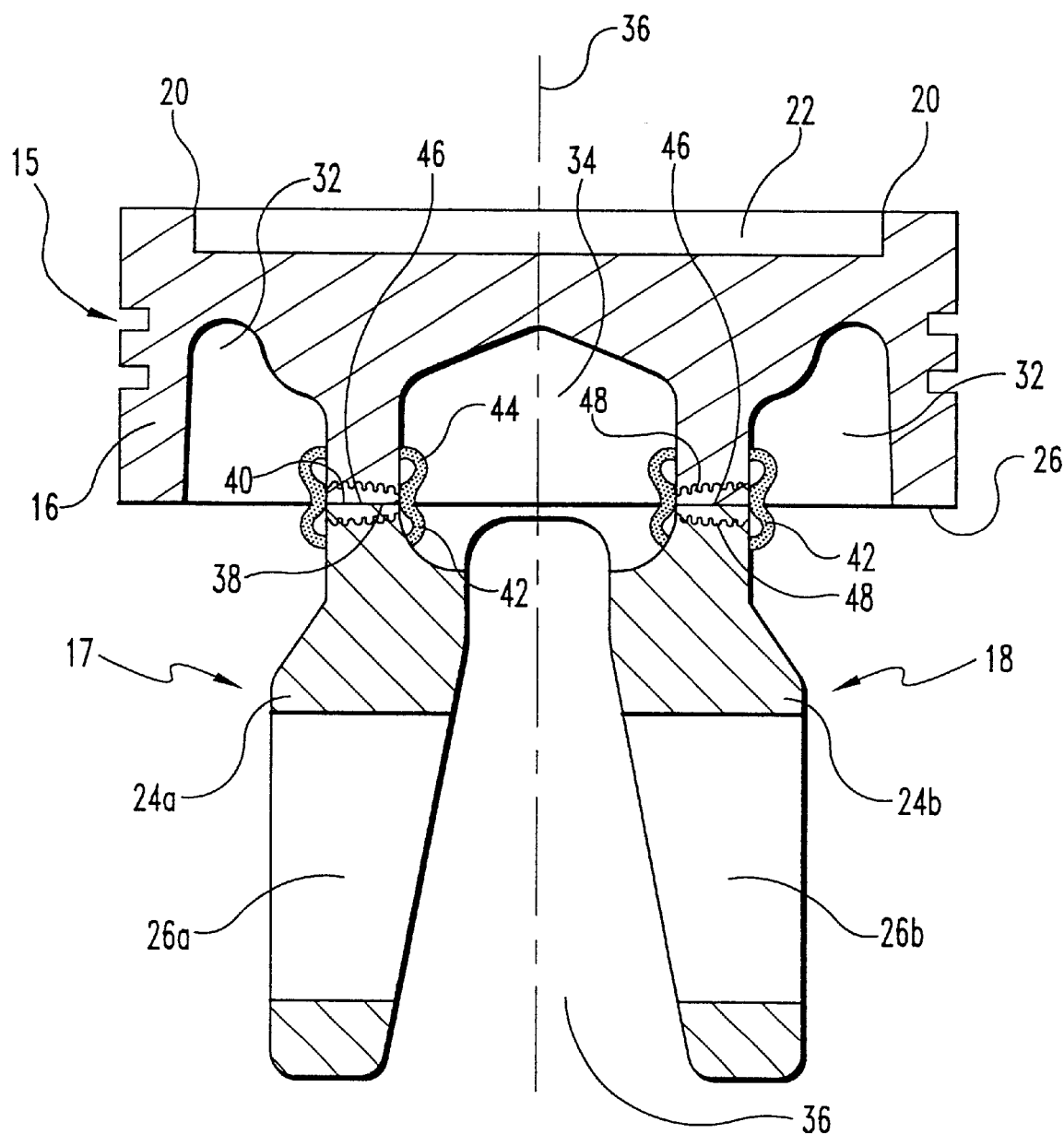
FIG. 2 is a cross-sectional view taken along section line 2—2 of the piston head of FIG. 1.

Referring additionally to FIG. 2 first portion 15 and second portion 18 are illustrated in FIG. 2. While not required, first portion 15 can be provided with a wide variety of structural features designed to enhance efficiency, heat dissipative properties, durability, and/or strength of the piston head 12. Such structural features include, for example, combustion rim 20 and combustion bowl 22 formed in piston crown 16, and cavities 32 and 34 opening in a downward direction and concentric about a center line axis 36 of piston crown 16. Additional features to improve the cooling properties of the piston, decrease weight and enhance compressional strength also can be provided. Such features are known to those skilled in the art.

First portion 15 is formed of a high temperature-resistant steel alloy. Preferably, the high temperature-resistant steel alloy comprises about 0.1 to about 0.5 weight percent (wt%) carbon, up to about 0.6 wt % manganese, about 4.0 to about 6.0 wt % chromium, about 0.45 to about 0.65 wt % molybdenum, up to about 0.5 wt % nickel and the balance iron and incidental impurities or so-called tramp metals. To improve machinability, the high temperature-resistant steel alloy also can include up to about 0.04 wt % phosphorous and up to about 0.04 wt % sulfur.

The high temperature-resistant steel alloy is selected to be resistant to temperatures in excess of 500° C. and exhibits significantly reduced high temperature oxidation and increased temper resistance. An example of a commercially available temperature-resistant steel alloy for use in this invention is manufactured under the ASTM designation F5A. A further commercially available sample is AISI type H11.

Appending from the underside surface 26 of piston crown 16 is second portion 18. Second portion 18 defines a piston rod connecting member 17. Piston rod connecting member 17 includes a pair of pin bosses 24a and 24b. Second portion 18 also includes a passageway for receiving a wrist pin and preferably includes a pair of passageways 26a and 26b formed through pin bosses 24a and 24b, respectively. Passageways 26a and 26b are adapted to receive a wrist pin to pivotally couple piston head 12 to a connecting rod (not shown).

The second portion 18 preferably is formed of a steel material. In one embodiment, the preferred steel material is a steel alloy that includes about 0.30 to about 0.55 wt % carbon, about 0.4 to about 1.10 wt % manganese, about 0.40 to about 1.25 wt % chromium, about 0.15 to about 0.45 wt % molybdenum, up to about 0.4 wt % silicon, up to about 2 wt % nickel and the balance iron. The steel alloy can further include a material selected from the group of metals including up to about 0.040 wt % phosphorous, up to about 0.040 wt % sulfur, up to about 0.002 wt % lead and incidental impurities such as bismuth, arsenic, and tin.

In another embodiment, the second portion 18 is formed of a steel alloy that includes about 0.30 to about 0.55 wt % carbon, about 0.4 to about 1.10 wt % manganese, about 0.40 to about 1.25 wt % chromium, about 0.15 to about 0.45 wt % molybdenum, up to about 0.4 wt % silicon, and up to about 2 wt % nickel and greater than about 90 wt % iron. In addition to the materials listed above, the steel alloy for this embodiment can also include material selected from the group of metals including up to about 0.040 wt% phosphorous, up to about 0.040 wt % sulfur, up to about 0.002 wt % lead, up to about 0.002 wt % bismuth, up to about 0.04 wt % arsenic, up to about 0.025 wt % tin and other incidental impurities.

An example of a commercially available alloy steel for use in the present invention is sold under the AISI/SAE designations 4140H, 4145H, 4340 or similar structural steel. None-the-less, in alternative embodiments, second portion 18 may be formed of one or more other materials as would occur to those skilled in the art.

Lighter weight pistons are desired to increase the efficiency and fuel economy of the operating combustion engines. Pistons of the present invention can be made lighter and stronger by a variety of design variations, which can include providing structural features or thrust surfaces to withstand the thrust forces, eliminating material not needed to support the thrust surfaces, and providing cavities or chambers to enhance heat dissipation.

The first and second portions can be individually forged and machined to a desired shape prior to assembly. Individually machining the portions prior to assembly provides greater flexibility in piston configuration. For example, first portion 15 can be machined to include cavities 32 and 34. Cavities can be provided to improve the cooling properties of the piston crown and to provide a lighter weight piston, thus, increasing the efficiency of the heavy-duty diesel engine. Similarly, second portion 18 can be machined to include a hollow cavity 36 provided between pin bosses 24a and 24b. Thus, the second portion can be machined to provide minimal piston weight and yet provide sufficient structural strength to withstand the loading forces exerted during operation of a high-performance diesel engine.

In another embodiment, other portions of piston 10, such as second portion 18, are formed from generally the same high temperature-resistant steel alloy as first portion 15. In still another embodiment, first portion 15 and second portion 18 of piston head 12 are cast, machined, or forged as a single piece from the high temperature-resistant steel alloy described in connection with first portion 15 above. In other embodiments, second portion 18 can be formed from materials or alloys different than those described above. The different materials or alloys can include other types and/or amounts of alloying elements to modify the properties such as the structural strength of the second portion 18.

First portion 15 and second portion 18 preferably are assembled using friction welding techniques. Typically, either first portion 15 or second portion 18 is clamped in a spindle chuck, which is secured to a flywheel. The other portion is held in a stationary tailstock. The flywheel, spindle chuck and the included clamped portion are rotated at a sufficiently high speed. When the predetermined speed is reached, the driving power is cut from the flywheel. While the portion clamped in the spindle chuck is still rotating at a high rotational rate, the workpieces are thrust together, typically by a hydraulic ram. As the flywheel chuck and clamped portion decelerate, the stored energy in the rotating assembly is converted to frictional heat, resulting in heating and softening contacting opposing end portions 38 and 40. Before the rotation ceases, the two end portions 38 and 40 bond together forming weld region 48. The remaining stored energy from the rotating assembly hot works a metal interface in weld region 48, expelling any impurities or voids and refining grain structure. Molten metal expelled from weld region 48 forms upsets 42 and 44. Weld 46 produced by this technique provides a high mechanical resistance bond in which the metal is equal or superior to that of either of the two base alloys. A small volume of metal adjacent to weld 46 is heated by the friction weld process; this small volume of metal acts as a heat sink and quenches weld 46. Further, the weld region 48 defines a narrow band of material that exhibits a fine-grained structure. Weld region 48 exhibits generally a significantly reduced amount of defects or inclusions commonly observed in other types of welding techniques. Further, welding region 48 is significantly monolithic.

Preferably, prior to welding the first portion 15 and second portion 18 are provided in forged blanks having suitable dimensions to compensate for the loss of material expelled in upset 44 and 42, respectively. It is also desirous that the first material and the second material are selected to be compatible during the friction welding technique. Generally, this includes selecting materials that provide substantially the same amount of upset or volume of metal in the upset formed during the friction welding operation.

The assembled piston head 12 is machined in one or more steps or processes to provide the assembled piston head 12 within desired dimensional tolerances. Typically during these steps or processes the upsets 42 and 44 adjacent to weld region 48 are removed.

The assembled piston head can be heat treated. For example, the assembled piston head can be heat treated to provide the desired mechanical strength, hardness and durability properties by methods known and/or commonly used by those skilled in the art. One example of a suitable heat treatment for use with this invention includes austenizing and/or tempering. In one embodiment, the assembled piston head 12 is solution heat-treated at about 1,550° F.±25° F. for about 1 to about 3 hours. The heated piston head is then oil-quenched to about 200° F. to about 225° F. Thereafter, the piston head is tempered at about 1,100° F.±10° F. for about 1 to about 3 hours and then air-cooled to room temperature.

As described above, the first material is selected to provide a high temperature-resistant steel alloy, and the second material is selected of high structural-strength steel having sufficient strength to withstand the load forces of a heavy-duty diesel engine. Furthermore, the first material and the second material are selected to be heat compatible. Preferably the first material and the second material have compatible coefficients of thermal expansion, such that as the assembled piston heat is heated and cooled, minimal stress is created in the friction weld 46 and weld region 48 proximate thereto.

Preferably, the first material and the second material are selected to be filly heat treated in the same heat treatment operation. A heat treatment operation can include one or more heating and cooling cycles. For example, both materials can be austenized by heating piston head 12 to a critical temperature range followed by cooling at a rate sufficient to form a martenite phase in the steel alloys of both materials. Both materials can be tempered by reheating to a second temperature to provide an assembled piston head that is fully heat treated without weakening the friction weld. However, in other embodiments, different heat treatment techniques and processes may be utilized or may be absent.

In further embodiments, first portion 15 and second portion 18 can be connected together by methods other than friction welding. Examples of other methods include welding, bonding or brazing to form an assembled piston head.

Further, it will be appreciated by those skilled in the art that the processes, materials and inventive concepts described in this application can be employed to provide other components useful in high temperature applications and to repair such components. The components can include, for example, intake valves, exhaust valves, oil/rock drills, helicopter rotors, turbine components, and the like.

The present invention contemplates modifications to the described structures and methods as would occur to those skilled in the art. It is also contemplated that processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art.

All publications and alloy designations cited in this specification are herein incorporated by reference as if each individual publication and alloy designation were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention are desired to be protected.

We claim:

1. A piston comprising:
  a first portion formed of a first material including, in weight percent, about 0.1% to about 0.5% carbon, up to about 0.6% manganese, about 4.0% to about 6.0% chromium, about 0.45% to about 0.65% molybdenum, up to about 0.5% nickel and the balance iron and incidental impurities, and
  a second portion formed of a second material comprising a steel alloy.

2. The piston of claim 1 wherein the first material further includes, in weight percent, up to about 0.040% phosphorus and up to about 0.040% sulfur.

3. The piston of claim 1 wherein the second material is of different composition than the first material.

4. The piston of claim 1 wherein the second portion is formed of a second material comprising, in weight percent, about 0.30% to about 0.55% carbon, about 0.4% to about 1.10% manganese, about 0.40% to about 1.25% chromium, about 0.15% to about 0.45% molybdenum, up to about 0.4% silicon, up to 2% Ni, and greater than about 90% iron.

5. The piston of claim 4 wherein the second material further includes one or more of the metals selected from, in weight percent, up to about 0.040% phosphorus, up to about 0.040% sulfur, up to about 0.002% lead, up to about 0.002% bismuth, up to about 0.04% arsenic, up to about 0.025% tin and mixtures thereof.

6. The piston of claim 1 wherein the first portion and the second portion are connected together by a friction weld region.

7. The piston of claim 1 wherein the first portion defines a piston crown.

8. The piston of claim 1 wherein the second portion defines a piston rod connecting member with a passageway to receive a connecting rod pin.

9. The piston of claim 1 wherein the first portion defines a piston crown and the second portion is shaped for journaling to a connecting rod by a connecting rod pin, and said first and second portions are connected by a friction weld region.

10. The piston of claim 1 and further including a piston skirt.

11. An apparatus comprising:
    a piston head including:
        a first portion formed of a first material comprising, in weight percent, about 0.1% to about 0.5% carbon, up to about 0.6% manganese, about 4.0% to about 6.0% chromium, about 0.45% to about 0.65% molybdenum, up to about 0.5% nickel, and the balance iron and incidental impurities, and
        a second portion formed of a second material comprising a steel alloy.

12. The apparatus of claim 11 wherein the first material further includes, in weight percent, up to about 0.040% phosphorus and up to about 0.40% sulfur.

13. The apparatus of claim 11 wherein the second portion is formed of a second material comprising, in weight percent, about 0.30% to about 0.55% carbon, about 0.4% to about 1.10% manganese, about 0.40% to about 1.25% chromium, about 0.15% to about 0.45% molybdenum, up to about 0.4% silicon, up to 2% nickel, up to about 0.040% phosphorus, up to about 0.040% sulfur, up to about 0.002% lead and the balance iron and incidental impurities.

14. The apparatus of claim 11 further including a piston skirt.

15. A method of forming an articulated piston head, said method comprising:
    providing a first portion comprising a first material that includes, in weight percent, about 0.1% to about 0.5% carbon, up to about 0.6% manganese, about 4.0% to about 6.0% chromium, about 0.45% to about 0.65% molybdenum, up to about 0.5% nickel, up to about 0.040% phosphorus, up to about 0.040% sulfur and the balance iron and incidental impurities;
    providing a second portion comprising a second material of a steel alloy; and
    friction welding the first portion to the second portion to provide the articulated piston head.

16. The method of claim 15 wherein the second material comprises, in weight percent, about 0.30% to about 0.55% carbon, about 0.4% to about 1.10% manganese, about 0.40% to about 1.25% chromium, about 0.15% to about 0.46% molybdenum, up to about 0.4% silicon, up to about 2% nickel, up to about 0.040% phosphorus, up to about 0.040% sulfur, up to about 0.002% lead, up to about 0.002% bismuth, up to about 0.04% arsenic, up to about 0.025% tin and greater than about 90% iron.

17. The method of claim 15 further including heat treating the piston head.

18. The method of claim 15 wherein the first portion defines a piston crown.

19. The method of claim 15 wherein the second portion defines a piston rod connecting member with a passageway provided to receive a connecting rod pin.

20. The method of claim 15 further comprising removing an upset portion from the articulated piston head after said friction welding.

* * * * *